United States Patent Office 3,437,145
Patented Apr. 8, 1969

---

3,437,145
METHOD OF CONSOLIDATING LOOSE SANDS USING FURFURYL ALCOHOL COMPOSITIONS
Billy J. Johnson, Houston, Tex., and Kenneth D. Totty and Bill M. Young, Duncan, Okla., assignors to Halliburton Company, Duncan, Okla., a corporation of Delaware
No Drawing. Filed Mar. 30, 1967, Ser. No. 626,957
Int. Cl. E21b 33/13
U.S. Cl. 166—295                                    8 Claims

ABSTRACT OF THE DISCLOSURE

Furfuryl alcohol resins in combination with lactones, dioxanes, pyrrolidones, aldehydes or phenols for sand control in wells and other subterranean formations.

---

Background of the invention

The field of this invention relates to sand control in wells and other subterranean formations.

Various sand consolidation methods and techniques have been employed to prevent or inhibit sand movement with crude oil production. Some of the methods heretofore employed are gravel packing, use of various filter materials, use of mechanical filters and screens, cementing with preservation of interstices, wetting the unconsolidated sand with a bonding resin, and placing a resin-treated sand between the loose sand in the formation and the well bore to form a screen.

U.S. Patents 3,209,826 and 3,199,590 disclose resinous compositions used for sand consolidation. U.S. Patent 3,199,590 specifically describes the utilization of furfuryl alcohol resins alone, or in combination with furfuryl alcohol.

Although consolidations can be obtained using furfuryl alcohol resin alone or furfuryl alcohol alone, such consolidations are not as strong or of as great extension as consolidations made using both furfuryl alcohol resin and furfuryl alcohol. Furfuryl alcohol is quite reactive with the furfuryl alcohol resin, and we have found that a polymerization reaction occurs rather rapidly at temperature above about 140° F., even in the absence of a catalyst. Sand consolidations are now being considered for high temperature formations as high as 500° F. The furfuryl alcohol resin-furfuryl alcohol system is characterized by a short placement times in high temperature formations preventing the complete penetration of the sand in the zone. The present invention obviates these problems by providing new compositions for injection in incompetent or loose sand formations. More particularly, in the present invention, the furfuryl alcohol is replaced, in whole or in part, by one or more compounds which we have found to have either reduced or no reactivity with furfuryl alcohol resins.

Summary of the invention

Briefly, the present invention comprises first, pumping an acid-curable consolidating fluid comprising furfuryl alcohol resin and a resin solvent compound selected from the group consisting of lactones, dioxanes, pyrollidones, aldehydes and phenols, into the unconsolidated sand or earth formation, and secondly, pumping an oil overflush solution having a relatively high degree of immiscibility with the consolidating fluid and containing a low molecular weight organic acid or acid-producing chemical dispersed or dissolved therein. A small quantity of diesel oil spacer may be used between the resin and catalyst solution if desired. The overflush functions to remove the excess bonding material from the existing pore spaces to provide the necessary permeability, and its acid-producing components subsequently hardens the remaining film of consolidating fluid covering the sand or earth particles, thereby consolidating or stabilizing the loose formation.

It is an object of the present invention to provide a new and improved permeable and consolidated barrier in high temperature formations to facilitate fluid production essentially free of solids.

Another object of the present invention is to provide a new and improved consolidating fluid mixture which is especially suited for deep penetration of high temperature formations.

It is yet another object of the present invention to provide a new and improved consolidating fluid which has little or no tendency to cure until contacted with an acidic catalyst.

These and other objects and advantages of the invention will become apparent from the more detailed description which follows.

Description of the preferred embodiments of the invention

The sand consolidation method and composition of the present invention is particularly adapted for consolidating loose or incompetent sands found in an oil or gas well traversing warm zones whereby a strong, stable and permeable consolidation is obtained. It provides a much needed improvement for solving migratory sand problems in such oil and gas wells. The dioxanes, lactones and pyrrolidones are essentially non-reactive with furfuryl alcohol resins, even at elevated temperatures. The aldehydes and phenols are reactive with the resins but less so than furfuryl alcohol. Thus, placement can be completed without difficulty and the onset of curing controlled by the timing of the injection of the overflush carrying the acid curing catalyst for the resin.

Basically, the preferred form of the method of the present invention comprises treating a formation with four separate fluids of low viscosity as follows:

(1) A surfactant-oil preflush for cleaning perforations, removing water blocks, and promoting preferentially water-wet properties to deformation sands;

(2) The consolidating fluid;

(3) Diesel oil spacer for distributing consolidating fluid to maximum coverage; and (4) Oil-catalyst solution for overflushing and curing of the consolidating fluid.

The following formulae illustrate preferred additives for the consolidating fluid.

The dioxanes have the general formula

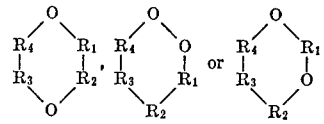

wherein

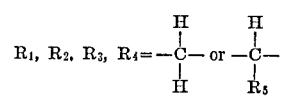

and $R_5 = 1$ to 5 carbon atoms or —OH.

Examples: 1,4-dioxane, 1,3-dioxane, 5-hydroxy-2-methyl, 1,3-dioxane.

The pyrrolidones have the formula

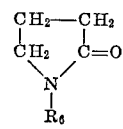

wherein $R_6$=vinyl, hydrogen or lower alkyl, that is, contains from 1 to about 6 carbon atoms.

Examples: N-methyl-2-pyrrolidone, 2-pyrrolidone, N-vinyl-2-pyrrolidone.

The lactones have the formula

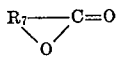

wherein $R_7$ contains from 1 to about 10 carbons atoms. It will be understood that the oxygen (—O—) linkage may bridge either adjacent or non-adjacent carbon atoms in the $R_7$ group with the carboxyl group.

Examples: propiolacetone, butyrolacetone, valerolactone.

The aldehydes have the formula

wherein $R_6$ is furanyl, hydrogen or aldehyde or

Examples: formalin, glyoxal, furfural.

The phenols have the formula

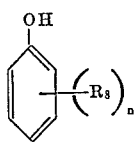

wherein $R_8$ is methyl, methylol or hydroxy, and $n$ is an integer from 0 to 2.

Examples: o-cresol, 2,6-dimethylolphenol, 2,4-dimethylolphenol phenol, 3,5-xylenol, m-cresol, p-cresol resorcinol.

The consolidating fluid of the present invention comprises furfuryl alcohol resin, together with dioxanes, pyrrolidones, lactones, aldehydes or phenols, alone or in combination with a silane, a surfactant, and water.

The term "silane" is used to identify such compositions as are disclosed in patent application Ser. No. 260,825. These silanes have been found to be particularly useful in obtaining strong sets or high compressive strength consolidations. U.S. Patents 2,830,809 and 2,832,754 also disclose suitable silane materials.

The surfactant used in the consolidating fluid and in the overflushes is preferably Hyflo, a well known commercial surfactant. Hyflo is a trademark of the Halliburton Company used to identify an oil-soluble surface active agent described in U.S. Patent No. 2,946,747. Any other suitable surfactant may be utilized without departing from the scope of the present invention.

The catalyst is dissolved in an overflush solution which possesses a high degree of immiscibility with the bonding material. Such a favorable characteristic considerably lessens the possibility of removing too much of the consolidating fluid from the sand or earth particles.

The oil overflush solution used in the present invention, and the acid catalysts therefor, include any of those disclosed in United States Patent No. 3,209,826.

The following examples are presented solely to illustrate the invention and should not be regarded as limiting in any way. In the examples, the parts and percentages are by weight unless otherwise indicated.

Example I

A number of tests were made using a consolidating fluid of the following formula:

| | Parts by weight |
|---|---|
| Furfuryl alcohol resin | 121 |
| Additive | 226 |
| Gamma aminopropyltriethoxysilane | 1.42 |
| Water | 10 |
| Hyflo surfactant | 1.43 |

Diethyl phthalate was added to the above formulation in an amount of 15 gallons per 4 barrels of the formulation.

A short section (about 7 inches) of glass tubing having an inside diameter of 25 mm. was vertically mounted on a stand. A perforated rubber stopper was inserted in the lower end of the column. A small section of copper wire screen was positioned over the perforation and over this screen was placed a thin section of glass wool. A three inch column of Oklahoma No. 1 dry sand was packed in the tubing. The sand was then flushed with 30 cc. of standard brine solution, 30 cc. of diesel oil, 15 cc. of consolidating fluid, 250 cc. of diesel oil and 500 cc. of trichloroacetic acid catalyst diesel oil solution (82 parts diesel oil and 2 parts acid). All fluids were heated to 140° F. prior to squeezing through the sand. The fluid injection pressure was 4–6 p.s.i. Compressive strength measurements were made on the cores after 24 hours at 150° F. The compressive strength tests were made by breaking the glass tubing away from the cores and cutting an inch section from the middle of the core for use in testing.

TABLE 1.—COMPRESSIVE STRENGTHS
[Pounds per square inch]

| Additive | No boil | 2 hr. boil | 6 hr. boil | 12 hr. boil |
|---|---|---|---|---|
| Furfuryl alcohol | 1,063 | 1,200 | 1,113 | 1,063 |
| 50-50 furfuryl alcohol and butyrolactone | 1,018 | 1,696 | 1,705 | 1,536 |
| 50-50 furfuryl alchol and N-methyl-2-pyrrolidone | 982 | 1,339 | 1,205 | 1,277 |
| Furfuryl alcohol | 959 | 1,054 | 964 | 947 |
| 100% butyrolactone | 807 | 1,036 | 1,179 | 884 |
| 100% N-methyl-2-pyrrolidone | 964 | 1,063 | 1,152 | 938 |

The strength figures above are averages of 3 runs.

Definition of boil

These cores were brought to a boiling temperature in fresh water and held for the indicated time interval. The compressive strength was taken on the boiled core at near boiling temperature.

TABLE 2.—AIR PERMEABILITY, DARCIES

| Additive | Percent bentonite | | |
|---|---|---|---|
| | 0 | 5% | 10% |
| Furfuryl alcohol | 7.6 | 3.0 | |
| 50-50 furfuryl alcohol and butyrolactone | 7.7 | 3.0 | |
| 50-50 furfuryl alcohol and N-methyl-2-pyrrolidone | 7.5 | | 0.9 |

TABLE 3.—COMPRESSIVE STRENGTHS
[Pounds per square inch] [1]

| Additive | Fluid injection temperature | |
|---|---|---|
| | 80° F. | 180° F. |
| Furfuryl alcohol | 17 | 542 |
| 50-50 furfuryl alchol and butyrolactone | 151 | 798 |
| 50-50 furfuryl alcohol and N-methyl-2-pyrrolidone | 158 | 904 |

[1] Strengths were taken immediately upon consolidation.

TABLE 4

| Additive | Type sand used | Compressive strength p.s.i. 1½ hrs. at 180° F. | Compressive strength p.s.i. 24½ hrs. at 150° F. | Percentage of column consolidation |
|---|---|---|---|---|
| Furfuryl alcohol | Clean | 880 | 411 | 100 |
| | 5% clay | | | 50 |
| 50-50 furfuryl alcohol and butyrolactone | Clean | 224 | | 100 |
| | 5% clay | | 414 | 100 |
| 50-50 furfuryl alcohol and dioxane | Clean | 828 | | 100 |
| | 5% clay | | | 100 |
| 50-50 furfuryl alcohol and N-methyl-2-pyrrolidone | Clean | 1094 | | 100 |
| | 5% clay | | 661 | 100 |
| 50-50 furfuryl alcohol and N-methyl-2-pyrrolidone | Clean | 1094 | | 100 |
| | 5% clay | | 661 | 100 |
| 100% dioxane | Clean | 494 | | 100 |
| | 5% clay | | 335 | 100 |
| 100% butryolactone | Clean | 853 | | 100 |
| | 5% clay | | 224 | 100 |

Example II

Resin formulations consisted of 121 to 1.43 to 226 to 10 to 1.43 parts by weight respectively of Durez 21687 furfuryl alcohol resin, gamma-aminopropyltriethoxysilane, formalin or furfural, water and Hyflo respectively. All fluids were injected in the loose sands at 80° F. A curing or consolidation time of 24 hours at 200° F. was permitted prior to running compressive strength measurements. The results are shown in the following table.

TABLE 5

| Consolidation No. | Monomeric material used | Sand identity | Compressive strength, p.s.i., of consolidation |
|---|---|---|---|
| 1 | Furfural | Oklahoma No. 1 | 1,465 |
| 2 | do | Oklahoma No. 1 containing 4% bentonite | 768 |
| 3 | Formalin | Oklahoma No. 1 | 1,015 |
| 4 | do | Oklahoma No. 1 containing 4% bentonite | 1,317 |

Example III

Following the procedure of Example I, the following results were obtained. The compressive strength measurements were made on the cores after 24 hours at 140° F.

TABLE 6

| Additive | Furfuryl alcohol resin additive ratio, parts by volume | Compressive strength, p.s.i., of consolidation |
|---|---|---|
| B-propiolactone | 1:2 | 558 |
| 4-valerolactone | 1:2 | 703 |
| 2-pyrrolidone | 1:2 | 498 |
| N-vinyl-2-pyrrolidone | 1:2 | 312 |

The foregoing data indicate that the strength of the consolidated sands prepared in accordance with this invention are generally of the same order of magnitude or higher than those obtained using furfuryl alcohol. Those skilled in the art will appreciate that the use of the furfuryl alcohol resin formulations of the present invention will permit deep penetration of resin and effective consolidation of sands over a much wider range of formation temperatures than has been possible in the past.

The disclosure of all of the various patents referred to herein are intended to be expressly incorporated by reference.

Having fully described the invention, it is intended that it be limited only by the lawful scope of the appended claims.

We claim:

1. A method of permeably consolidating loose sands comprising introducing a non-catalyst bearing acid curable consolidating fluid into a formation to be consolidated, said consolidating fluid comprising a component selected from the group consisting of furfuryl alcohol resin, furfuryl alcohol and mixtures thereof, and an additive therefor selected from the group consisting of lactones, dioxanes, pyrrolidones, aldehydes and phenols, and thereafter introducing an oil overflush solution having a relatively high degree of immiscibility with the consolidating fluid into the formation, said overflush solution containing a quantity of catalyst dispersed therein for curing said resin in the formation, thereby consolidating said loose sands into a hard permeable mass.

2. The method of claim 1 wherein a spacer of diesel oil and a surfactant is used between said consolidating fluid and said oil overflush solution.

3. The method of claim 1 wherein the formation is preflushed with a mixture of diesel oil and surfactant.

4. The method of claim 1 wherein said consolidating fluid contains a silane.

5. The method of claim 1 wherein such consolidating fluid contains a surfactant.

6. The method of claim 1 wherein the additive comprises butyrolactone.

7. The method of claim 1 wherein the additive comprises dioxane.

8. The method of claim 1 wherein the additive comprises N-methyl-2-pyrrolidone.

References Cited

UNITED STATES PATENTS

| 3,123,137 | 3/1964 | Young et al. | 166—33 |
| 3,199,590 | 8/1965 | Young | 166—33 |
| 3,209,826 | 10/1965 | Young | 166—33 |
| 3,373,812 | 3/1968 | Smith | 166—33 |
| 3,373,813 | 3/1968 | Jennings et al. | 166—33 X |

STEPHEN J. NOVOSAD, *Primary Examiner.*